(12) United States Patent
Yang et al.

(10) Patent No.: US 11,762,992 B2
(45) Date of Patent: Sep. 19, 2023

(54) INTRUSION DETECTION METHOD BASED ON IMPROVED IMMUNE NETWORK ALGORITHM, AND APPLICATION THEREOF

(71) Applicant: Hubei University, Wuhan (CN)

(72) Inventors: Chao Yang, Wuhan (CN); Beijun Li, Wuhan (CN); Zhen Cheng, Wuhan (CN); Aoran Luo, Wuhan (CN); Jianfeng He, Wuhan (CN)

(73) Assignee: Hubei University, Wuhan (CN)

( * ) Notice: Subject to any disclaimer, the term of this patent is extended or adjusted under 35 U.S.C. 154(b) by 0 days.

(21) Appl. No.: 17/953,349

(22) Filed: Sep. 27, 2022

(65) Prior Publication Data
US 2023/0095966 A1 Mar. 30, 2023

(30) Foreign Application Priority Data
Sep. 27, 2021 (CN) .......................... 202111136304.7

(51) Int. Cl.
*G06F 21/55* (2013.01)
(52) U.S. Cl.
CPC ...... *G06F 21/554* (2013.01); *G06F 2221/034* (2013.01)

(58) Field of Classification Search
CPC .......................... G06F 21/554; G06F 2221/034
USPC ........................................................... 726/23
See application file for complete search history.

(56) References Cited

U.S. PATENT DOCUMENTS

| | | | |
|---|---|---|---|
| 2005/0033984 A1 | 2/2005 | Doherty et al. | |
| 2014/0139678 A1 | 5/2014 | Moriarty et al. | |
| 2018/0349779 A1* | 12/2018 | Fliri | H04L 41/12 |
| 2019/0098024 A1 | 3/2019 | Gaivoronski et al. | |

* cited by examiner

*Primary Examiner* — Anthony D Brown
(74) *Attorney, Agent, or Firm* — Zhigang Ma (57) ABSTRACT

The present disclosure belongs to the technical field of intrusion detection, specifically provides an intrusion detection method based on an improved immune network algorithm, and an application thereof The method includes: S1, initializing an antibody group; S2, calculating affinities between antigens and antibodies; S3, searching for a pair of inhomogeneous antigens which have the highest affinities and referred to as a duality antigen; S4, determining a boundary antibody set C; S5, determining a neighbor antibody set; S6, cloning and mutating, according to the affinities, obsolete antibodies to update a subnetwork to which the antigens belong; S7, calculating an average affinity between the antibodies in the boundary antibody set C and the antigens in the duality antigen; and S8, inhibiting the network, and simplifying the network to output a result network subset. The solution has relatively high detection accuracy and relatively low false alarm rate.

6 Claims, 3 Drawing Sheets

INTRUSION DETECTION METHOD BASED ON IMPROVED IMMUNE NETWORK ALGORITHM, AND APPLICATION THEREOF

TECHNICAL FIELD

The present disclosure relates to the technical field of intrusion detection, more specifically, to an intrusion detection method based on an improved immune network algorithm, and an application thereof

BACKGROUND

Intrusion detection is a process of identifying those intrusion behaviors that attempt to destroy the characteristics of a computer or a computer network, such as the confidentiality, the integrity, and the security. The essence of the intrusion detection is to analyze key information of a computer host or computer network, extract main features, correspondingly compare the main features with a basic general computer model, and then make an intelligent judgment.

Intrusion detection technologies include misuse detection and anomaly detection. In the misuse detection technology, an intrusion behavior feature library needs to be built in advance, and a method of characteristic matching is used to determine whether there is an intrusion behavior during intrusion detection. In the anomaly detection technology, a normal behavior model needs to be built by means of training a data set in advance, and whether there is an intrusion behavior is determined during intrusion detection according to whether there is an obvious deviation from the normal model. During the building of the intrusion behavior feature library or the normal behavior feature library, an algorithm is required to be able to handle with massive, heterogeneous, and mixed-attribute data regardless of data distribution, and the algorithm has good self-adaptive and self-learning performance. Therefore, common methods for intrusion detection include: a serial algorithm of an artificial immune system, a neural network, a swarm intelligence algorithm, a clustering algorithm, etc.

Defects of current solutions for main intrusion detection problems are as follows:

(1) A traditional clustering algorithm, such as K-MEDOIDS, K-MEANS, EM, and BIRCH, is generally only effective for small samples, has poor expansibility, is sensitive to initialization data, relies on clustering prototypes, and is easily stuck in local optimum when applied to an intrusion detection system.

(2) Although the swarm intelligence algorithm such as a neural network has good expansibility, it cannot effectively process boundary data and noise data. In the face of complex and changeable network environments, underreporting, misinformation, and the like often occur.

(3) A traditional artificial immune algorithm has certain adaptability, but it has low processing efficiency and low instantaneity, and cannot extract effective features from massive data due to the limitation of the characteristics of the traditional algorithm, resulting in low detection accuracy of the intrusion detection system. Specifically, the application of a traditional immune network algorithm in an artificial immune recognition model to the intrusion detection system still has the following shortcomings:

(a) If a boundary of a data subset is relatively blurred, or a sample set itself is noisy, this special antigen will strongly stimulate immune responses causing cell proliferation and leading to the problem of an unclear structure of an evolved network.

(b) The structure of the immune network is complex, and the training efficiency is low.

SUMMARY

The present disclosure aims to solve the technical problems below: When a traditional immune network algorithm in the prior art solves the problem of intrusion detection, if a training set has too much information noise or the boundary is blurred, initialization of antigen information cannot well guide a training process.

The present disclosure provides an intrusion detection method based on an improved immune network algorithm, including the following steps:

S1, initializing an antibody group as a network antibody subset to be trained, i.e. an antibody set B;

S2, calculating affinities between antigens and antibodies;

S3, searching for a pair of inhomogeneous antigens which have the highest affinities and referred to as a duality antigen;

S4, determining a boundary antibody set C, and if an absolute value of a difference value between the affinities between an antibody in the network antibody subset to be trained and a certain duality antigen is less than a threshold R, putting the antibody into the boundary antibody set;

S5, determining a neighbor antibody set, and if the affinity between an antibody in the network antibody subset to be trained and any antigen is less than a threshold M, eliminating the antibody, or if the affinity is not less than the threshold M, putting the antibody into a subnetwork to which an antigen with the highest affinity belongs;

S6, cloning and mutating, according to the affinities, obsolete antibodies to update a subnetwork to which the antigens belong;

S7, calculating an average affinity between the antibodies in the boundary antibody set C and the antigens in the duality antigen, and putting the antibodies with high affinities in the boundary antibody set C into the subnetwork to which the antigens belong; and S8, inhibiting the network, and simplifying the network to output a result network subset.

Optionally, the antigens represent various types of network traffic data, comprising attack data and normal data; and the antibodies represent trained detectors.

Optionally, S1 specifically includes selecting a data set CSE-CIC-IDS2018 as the network antibody subset to be trained, comprising data of five attack scenarios: Botnet, Infiltration of The Network from Inside, Brute-force, Dos and DDos, and performing averaging of features of various dimensions and principal component analysis (PCA) dimension reduction processing on the data set CSE-CIC-IDS2018.

Optionally, S3 specifically includes: selecting a training set to be processed as an antigen set $AG=\{ag_1, ag_2, \ldots, ag_i\}$, and initializing a generated antibody set $=\{b_1, b_2, \ldots, b_j\}$ by an algorithm; similarities between the antigens and the antibodies are represented by the affinities between the antigens and the antibodies; the affinity is represented by an Euclidean distance between the antigen set $AG=\{ag_1, ag_2, \ldots, ag_i\}$ and the antibody set $B=\{b_1, b_2, \ldots, b_j\}$; the formula of the affinity between the antigen and the antibody is:

$$D_{ij}=d(ag_i, b_j)=\sqrt{(ag_1-b_1)^2+\ldots+(ag_i-b_j)^2}$$

Optionally, S4 is specifically as follows: for an antigen $ag_i \in AG$, if it is determined that an inhomogeneous antigen $ag_j$ is closest to $ag_i$, $ag_i$ and $ag_j$ are the duality antigen; for $\forall b_k \in B$, $D_{ik}$ is the affinity between $b_k$ and $ag_i$, and $D_{jk}$ is the affinity between $b_k$ and $ag_j$;

if $|D_{ik}-D_{jk}|<r$, $b_k$ is put into the boundary antibody set C, $C \in B$.

Optionally, S5 specifically includes: for the antibody $b_x$ in the antibody set $B=\{b_1, b_2, \ldots, b_i\}$, if the affinities between $b_x$ and all the antigens in the antigen set $AG=\{ag_1, ag_2, \ldots, ag_i\}$ are less than M, eliminating $b_x$ or if the affinities are not less than M, putting $b_x$ into the subnetwork to which the antigen having the highest affinity with the antibody belongs.

Optionally, S6 specifically includes: cloning and mutating, according to the affinities, the obsolete antibodies to update the subnetwork to which the antigens belong, specifically: for the affinities between the antigens and the antibodies, selecting the first n antibodies with the highest affinities in the current candidate antibody set, the clone number of the antibody b, satisfying the following formula:

$$clone_{num} = \max\left(1, \text{int}\left(\frac{\text{Aff}_{b_i}+b}{a} * \max\_clone\right)\right)$$

where a and b are both constants, a>0; and max_clone is the maximum clone number;

In the mutation operation, the probability of mutation of the antibodies with higher affinities is smaller, so that relatively accurate attack type features remain, and a mutation operator is as follows:

$$M(b_i) = \begin{cases} \text{operator}(\sigma, b_i), \text{random}(0, 1) < mutation_{rate} \\ b_i, \text{ or} \end{cases}$$

where operator ($\sigma$, bi) is a crossover and mutation operation for the antibody bi and a neighbor antibody that is $\sigma$ spaced away;

$$\sigma = \max\left(1, \text{int}\left(\frac{\text{Aff}_{b_i}+b}{a} * \max\_clone\right)\right),$$

$\sigma$ is a value according to an antibody affinity; $\sigma$ is equal to 1 when the antibody affinity is large enough.

Optionally, S7 specifically includes: calculating the average affinities $D_{ik}$ and $D_{jk}$ between the antibodies in the boundary antibody set C and the antigens in the duality antigen according to the formula of the affinity between the antigen and the antibody, and putting the antibodies in the boundary antibody set C into a network subset with a high affinity to obtain the subnetwork to which the antigen belongs.

The present disclosure further provides an electronic device, including a memory and a processor, wherein the processor is configured to execute a computer management program stored in the memory to implement the steps of the intrusion detection method based on the improved immune network algorithm.

The present disclosure further provides a computer-readable storage medium, which stores a computer management program, wherein the computer management program, when executed by a processor, implements the steps of the intrusion detection method based on the improved immune network algorithm.

Beneficial effects: The present disclosure belongs to the technical field of intrusion detection, specifically provides an intrusion detection method based on an improved immune network algorithm, and an application thereof. The method includes: S1, initializing an antibody group; S2, calculating affinities between antigens and antibodies; S3, searching for a pair of inhomogeneous antigens which have the highest affinities and referred to as a duality antigen; S4, determining a boundary antibody set C; S5, determining a neighbor antibody set; S6, cloning and mutating, according to the affinities, obsolete antibodies to update a subnetwork to which the antigens belong; S7, calculating an average affinity between the antibodies in the boundary antibody set C and the antigens in the duality antigen, and putting the antibodies with high affinities in the boundary antibody set C into the subnetwork to which the antigens belong; and S8, inhibiting the network, and simplifying the network to output a result network subset. The solution has relatively high detection accuracy and relatively low false alarm rate. Meanwhile, since the algorithm provided in the present disclosure performs delay processing on class boundary antibodies, the negative effect on the performance of the algorithm when the boundary of the training set is blurred is reduced. Therefore, when applied to the intrusion detection system, the trained immune network subset has better performance than that of other traditional algorithms and can detect an unknown attack. To sum up, the improved immune network provided by the present disclosure has certain value as a new method for solving the intrusion detection.

DETAILED DESCRIPTION OF THE EMBODIMENTS

The specific implementation modes of the present disclosure are further described below in detail in combination with the accompanying drawings and embodiments. The embodiments below are used to illustrate the present disclosure, but are not intended to limit the scope of the present disclosure.

In an immune network algorithm, whether an antibody is effectively summarized to a corresponding antigen space has a great impact on the efficiency and accuracy of generating an immune network classifier. The evolution of a traditional artificial immune network relies on one-time representation of antigen information. If a boundary of a data subset is relatively bluffed, or a sample set itself is noisy, this special antigen will strongly stimulate immune responses, causing cell proliferation and leading to an unclear structure of an evolved network. In view of this, the following technical solutions of the present disclosure are provided.

Figure 1:
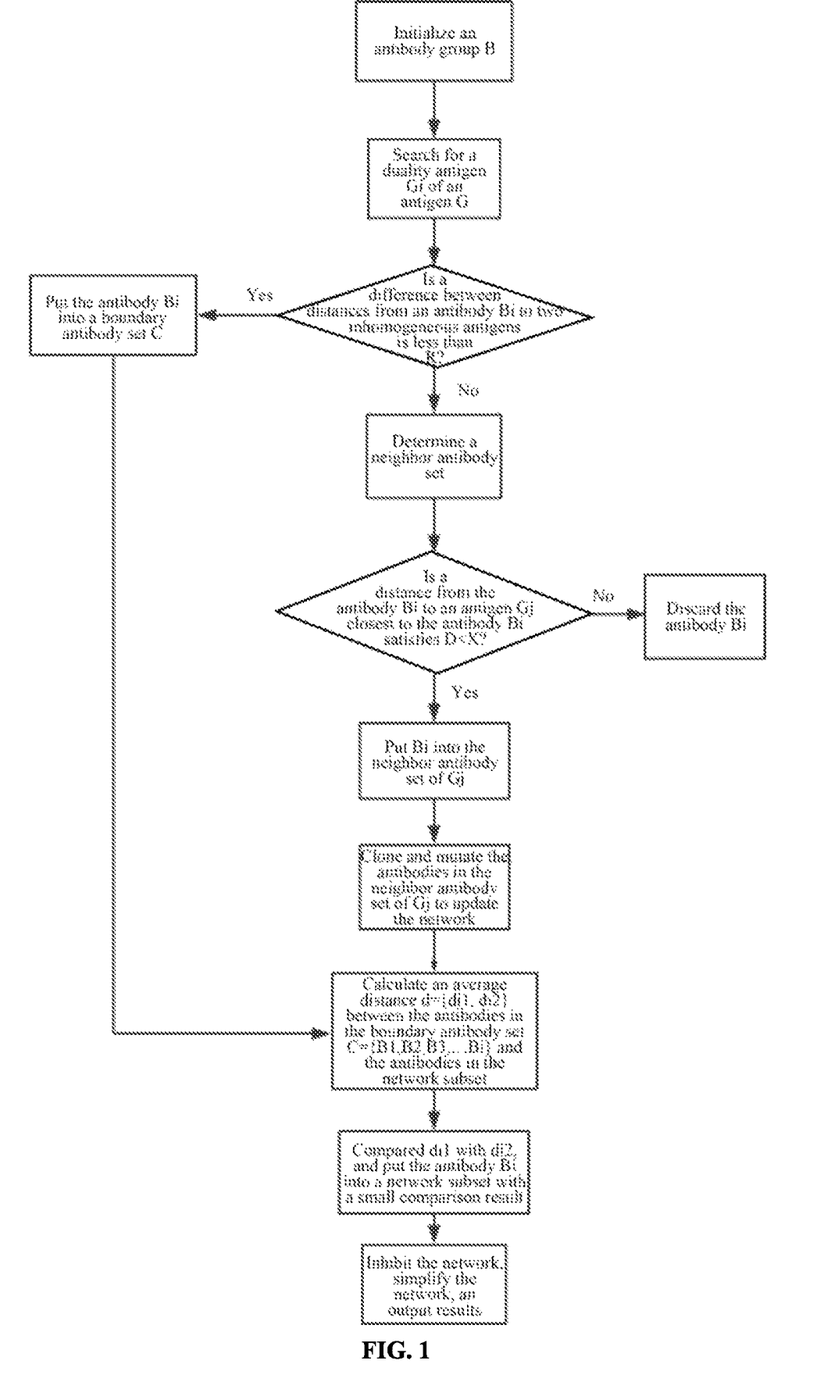
FIG. 1 is a flow chart of an intrusion detection method based on an improved immune network algorithm provided by the present disclosure.

As shown in FIG. 1 to FIG. 5, an embodiment of the present disclosure provides an intrusion detection method based on an improved immune network algorithm, including the following steps:

S1, an antibody group is initialized as a network antibody subset to be trained, i.e. an antibody set B;

S2, affinities between antigens and antibodies are calculated;

S3, a pair of inhomogeneous antigens which have the highest affinities and referred to as a duality antigen is searched for;

S4, a boundary antibody set C is determined; and if an absolute value of a difference value between the affinities between an antibody in the network antibody subset to be trained and a certain duality antigen is less than a threshold R, the antibody is put into the boundary antibody set;

S5, a neighbor antibody set is determined; and if the affinity between an antibody in the network antibody subset to be trained and any antigen is less than a threshold M, the antibody is eliminated, or if the affinity is not less than the threshold M, the antibody is put into a subnetwork to which an antigen with the highest affinity belongs;

S6, obsolete antibodies are cloned and mutated according to the affinities to update a subnetwork to which the antigens belong;

S7, an average affinity between the antibodies in the boundary antibody set C and the antigens in the duality antigen is calculated, and the antibodies with high affinities in the boundary antibody set C are put into the subnetwork to which the antigens belong; and S8, the network is inhibited and simplified to output a result network subset.

The solution has relatively high detection accuracy and relatively low false alarm rate. Meanwhile, since the algorithm provided in the present disclosure performs delay processing on class boundary antibodies, the negative effect on the performance of the algorithm when the boundary of the training set is blurred is reduced. Therefore, when applied to the intrusion detection system, the trained immune network subset has better performance than that of other traditional algorithms and can detect an unknown attack. To sum up, the improved immune network provided by the present disclosure has certain value as a new method for solving the intrusion detection.

Immune network algorithm: An immune network algorithm is a novel intelligent algorithm inspired by a specific immune response in a biological immune system, which is often used to solve classification problems.

Antibody: It specifically refers to a detection set that has been trained during intrusion detection in the present disclosure. Antigen: It specifically refers to different attack types in an intrusion detection training set in the present disclosure. Three Decision: It is a decision model proposed on the basis of a decision rough set. When current information is insufficient, it will not be directly "accepted" or "rejected", and decisions are made when there is more sufficient information learned, so as to avoid the risk of misjudgment caused by directly accepting or rejecting insufficient information.

An artificial immune system is an intelligent algorithm derived from the biological immune system. An immune network is a theoretical model representing an interaction between immune units in biological immunity. The immune units are in a relatively balanced biological state before antigen stimulation occurs. This balance is broken by intrusion of antigens, and specific antibody molecules are produced. When the specific antibody molecule reaches a certain number, an immune response will be caused, which is referred to as the specific immune response. Therefore, an antibody molecule can also be recognized by its idiotype antibody molecule while recognizing antigens. It is the production of this idiotypic antibody molecule that enables the body to rapidly make an immune response when stimulated by an antigen, thereby maintaining the balance of the body. The artificial immune network usually regards original data as antigens, and regards eigenvalues of various pattern classes as antibodies. The goal of network evolution is that a network can reflect the various pattern classes contained in an original data set after learning.

This embodiment of the present disclosure is an immune network classification algorithm based on Three Decision. In an algorithm training process, due to insufficient information at an initial training stage, "decision delay" is performed on antigens at a class boundary position. Through a comparative simulation experiment on a data set CSE-CIC-IDS2018, it is known that the improved algorithm has higher classification accuracy than other traditional classification algorithms, so that the false alarm rate is greatly reduced.

In a specific implementation scenario:

Step 1, an experiment and preprocessing are performed on the data set.

The data set CSE-CIC-IDS2018 is selected. The data set CSE-CIC-IDS2018 is a cooperation project between the Communication Security Agency and the Canadian Institute of Cyber Security. There are seven different network attack scenarios: Brute-force, Heartbleed, Botnet, Dos, DDos, Web attacks, and Infiltration of The Network from Inside. In this experiment, data of the following five attack scenarios are selected: Botnet, Infiltration of The Network from Inside, Brute-force, Dos, and DDos. Since the data set is relatively large and has too many redundant dimensions, the data set is required to be subjected to averaging of features of the various dimensions and PCA dimension reduction processing before the experiment. Basic information of the training set is as shown in the following table:

| Attack type | Dimension | The number of samples |
| --- | --- | --- |
| Bot | 10 | 8000 |
| Benign | 10 | 8000 |
| Infilteration | 10 | 8000 |
| SSH-Bruteforce | 10 | 8000 |
| Dos attack-GoldenEye | 10 | 8000 |

Step 2, samples are initialized, and parameters are initially set.

In the present disclosure, antigens represent various types of network traffic data, including attack data and normal data; and antibodies represent trained detectors. In this experiment, type Benign in the data set CSE-CIC-IDS2018 is selected herein as a normal type, and attack types Bot, Infilteration, SSH-Bruteforce, and Dos attack-GoldenEye are selected as anomaly types. Experiment parameters are set as follows:

| Antibody critical threshold | Antibody inhibition distance | Antibody radius | Maximum number of iterations |
|---|---|---|---|
| 0.12 | 0.4 | 0.81 | 550 |

Step 3, affinities between the initialized antibodies and the antigens in the training set are calculated.

According to the intrusion detection training algorithm, original data (i.e. the various types of network traffic data) is regarded as the antigens, and the eigenvalues of the various pattern classes are regarded as the antibodies. The goal of immune network evolution is that a trained network can reflect the pattern classes contained in the original data set after learning. In this step, the training set to be processed is an antigen set AG={$ag_1, ag_2, \ldots, ag_i$}, and the algorithm initializes a generated antibody set B={$b_1, b_2, \ldots, b_i$}.

Similarities between the antigens and the antibodies are represented by the affinities between the antigens and the antibodies. The affinity is represented by an Euclidean distance between the antigen set AG={$ag_1, ag_2, \ldots, ag_i$} and the antibody set B={$b_1, b_2, \ldots, b_i$}. The formula of the affinity between the antigen and the antibody is:

$$D_{ij} = d(ag_i, b_j) = \sqrt{(ag_1 - b_1)^2 + \ldots + (ag_i - b_j)^2}$$

Step 4, a boundary antibody set is summarized.

For an antigen $ag_i \in AG$, if it is determined that an inhomogeneous antigen $ag_j$ is closest to $ag_i$, $ag_i$ and $ag_j$ are a duality antigen.

The boundary antibody set is used for collecting sample points located on a class boundary of the training set, and which subnetwork that the boundary antibodies are more suitable for cannot be determined. The duality antigen $ag_i$ and $ag_j$ is known. For $\forall b_k 9 \in B$, $D_{ik}$ is the affinity between $b_k$ and $ag_i$, and $D_{jk}$ is the affinity between $b_k$ and $ag_j$.

if $|D_{ik} - D_{jk}| < r$, $b_k$ is put into the boundary antibody set C, $C \in B$.

Step 5, a neighbor antibody set is summarized.

For the antibody $b_x$ in the antibody set B={$b_1, b_2, \ldots, b_i$}, if the affinities between $b_x$ and all the antigens in the antigen set AG={$ag_1, ag_2, \ldots, ag_i$} are less than M, $b_x$ is eliminated, or if the affinities are not less than M, $b_x$ is put into the subnetwork to which an antigen having the highest affinity with the antibody belongs.

Step 6, cloning and mutation operations are performed.

Cloning and mutation operations are performed in the neighbor antibody set obtained in step 5. For the affinities between the antigens and the antibodies, the first n antibodies with the highest affinities in the current candidate antibody set are selected for cloning. The purpose of this step is to better extract attack features of the training set, so as to improve the intrusion detection accuracy. The clone number of the antibody $b_i$ satisfies the following formula:

$$clone_{num} = \max\left(1, \text{int}\left(\frac{Aff_{b_i} + b}{a} * \text{max\_clone}\right)\right)$$

where a and b are both constants, a>0; and max clone is the maximum clone number.

In the mutation operation, the probability of mutation of the antibodies with higher affinities is smaller, so that relatively accurate attack type features remain, and a mutation operator is as follows:

$$M(b_i) = \begin{cases} \text{operator}(\sigma, b_i), & \text{random}(0, 1) < mutation_{rate} \\ b_i, & \text{otherwise} \end{cases}$$

where operator ($\sigma$, bi) is a crossover and mutation operation for the antibody bi and a neighbor antibody that is $\sigma$ spaced away, $$\sigma = \max\left(1, \text{int}\left(\frac{Aff_{b_i} + b}{a} * \text{max\_clone}\right)\right);$$

$\sigma$ is a value according to an antibody affinity; $\sigma$ is equal to 1 when the antibody affinity is large enough.

Step 7, the boundary antibody set is delayed.

The average affinities $D_{ik}$ and $D_{jk}$ between the antibodies in the boundary antibody set C and the antigens in the duality antigen according to the formula of the affinity between the antigen and the antibody, and putting the antibodies in the boundary antibody set C into a network subset with a high affinity to obtain the subnetwork to which the antigen belongs.

Step 8, experiment and analysis are performed.

The main purpose of the experiment of the present disclosure is to verify whether the detection accuracy of the Three Decision-based immune network algorithm for intrusion detection is higher than that of the existing traditional intrusion detection algorithm. In order to make experimental results more accurate, an average value of 30 experimental results is used. When this algorithm is applied to the intrusion detection system, detection results of the four attack types are as shown in the following table:

| Algorithm | Known attack (%) | Unknown attack (%) |
|---|---|---|
| Bot | 90.23 | 84.72 |
| Infilteration | 89.57 | 80.28 |
| SSH-Bruteforce | 84.69 | 81.57 |
| Dos attack-GoldenEye | 86.55 | 78.27 |

When this algorithm is applied to the intrusion detection system, its performance is compared with those of a traditional C-mean clustering algorithm (algorithm a), an AiNet algorithm (algorithm b), and a naive bayes algorithm (algorithm c) in the following table:

| | Detection rate | | |
|---|---|---|---|
| Algorithm | Known attack (%) | Unknown attack (%) | False alarm rate (%) |
| Algorithm herein | 87.76 | 81.21 | 6.21 |
| Algorithm a | 67.32 | 57.61 | 9.73 |
| Algorithm b | 82.71 | 77.81 | 7.84 |
| Algorithm c | 81.33 | 72.37 | 10.53 |

It can be seen from the experimental results that with respect to three test sets, when compared with the traditional C-mean clustering algorithm (algorithm a), the AiNet algorithm (algorithm b), and the naive bayes algorithm (algorithm c), the algorithm provided by the present disclosure has higher detection accuracy and lower false alarm rate. Meanwhile, since the algorithm provided in the present disclosure performs delay processing on class boundary antibodies, the negative effect on the performance of the algorithm when the boundary of the training set is blurred is reduced. Therefore, when applied to the intrusion detection system, the trained immune network subset has better performance than that of other traditional algorithms and can detect an unknown attack. To sum up, the improved immune network provided by the present disclosure has certain value as a new method for solving the intrusion detection.

Figure 2:
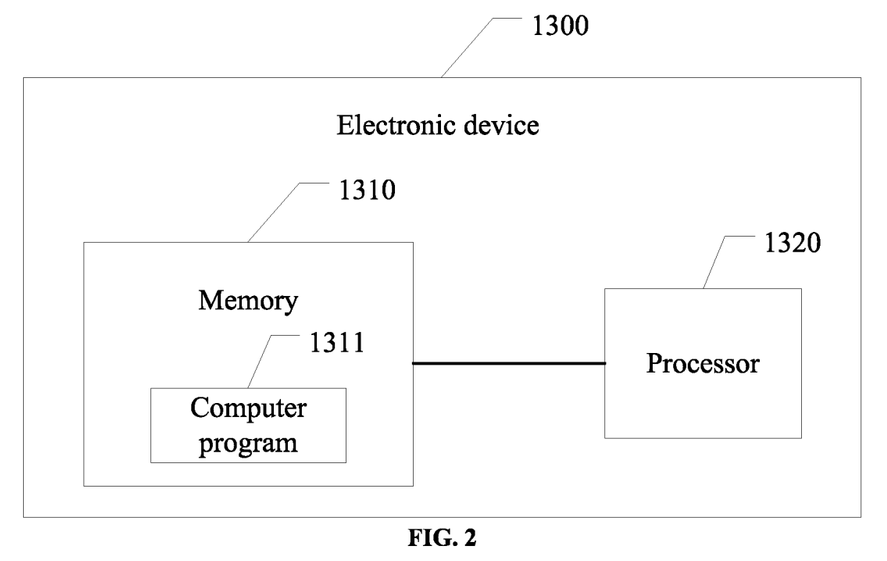
FIG. 2 is a possible schematic diagram of a hardware structure of an electronic device provided by the present disclosure.

FIG. 2 is a schematic diagram of an embodiment of an electronic device provided according to an embodiment of the present disclosure. As shown in FIG. 2, this embodiment of the present disclosure provides an electronic device, including a memory 1310, a processor 1320, and a computer program 1311 stored on the memory 1310 and executable on the processor 1320. The processor 1320, when executing the computer program 1311, implements the intrusion detection method based on the improved immune network algorithm. Descriptions thereof are omitted here.

Figure 3:
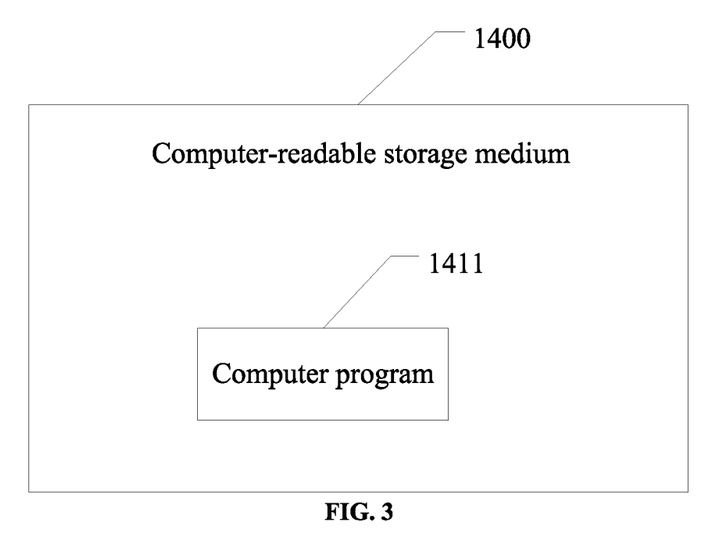
FIG. 3 is a possible schematic diagram of a hardware structure of a computer-readable storage medium provided by the present disclosure.
Figure 4:
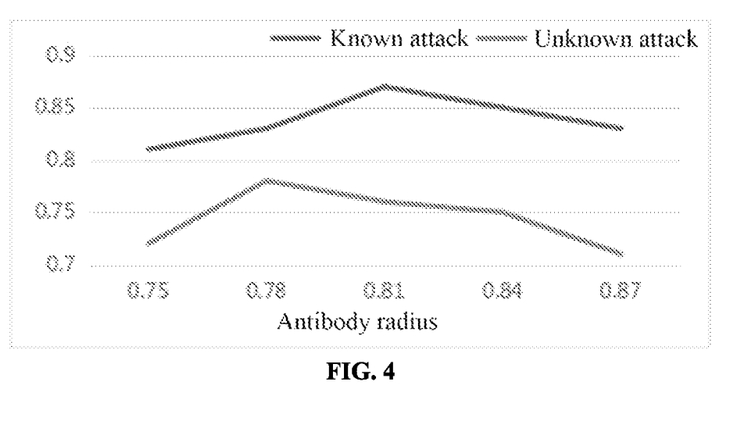
FIG. 4 is a diagram of impact of a change of an antibody radius on detection rates of a known attack and an unknown attack in an intrusion detection method based on an improved immune network algorithm.
Figure 5:
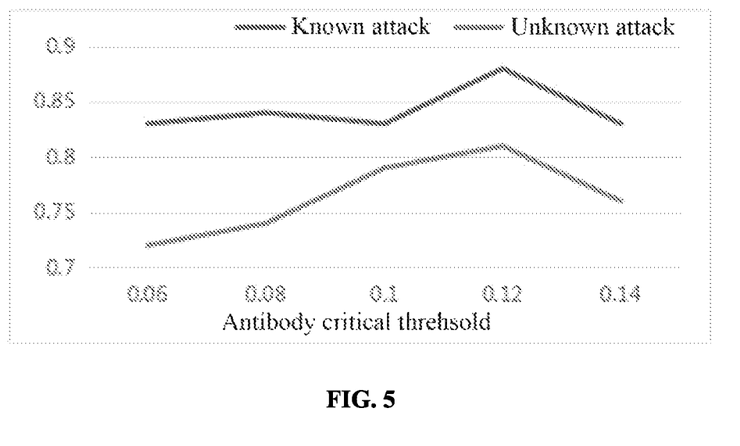
FIG. 5 is a diagram of impact of a critical threshold change of an antibody on detection rates of a known attack and an unknown attack in an intrusion detection method based on an improved immune network algorithm.

FIG. 3 is a schematic diagram of an embodiment of a computer-readable storage medium provided by the present disclosure. As shown in FIG. 3, this embodiment provides a computer-readable storage medium 1400, which stores a computer program 1411. The computer program 1411, when executed by a processor, implements the intrusion detection method based on the improved immune network algorithm. Descriptions thereof are omitted here.

It should be noted that in the above-mentioned embodiments, the descriptions of all the embodiments have their own focuses. For parts that are not described in detail in an embodiment, reference may be made to related descriptions of other embodiments.

Those skilled in the art should understand that the embodiments of the present disclosure may provide a method, a system or a computer program product. Therefore, the present disclosure may adopt the form of a complete hardware embodiment, a complete software embodiment, or a software and hardware combination embodiment. In addition, the present disclosure may adopt the form of a computer program product implemented on one or multiple computer-sensitive storage media (including, but not limited to, a magnetic disk memory, a Compact Disc Read-Only Memory (CD-ROM), an optical memory and the like) including computer-sensitive program codes.

The present invention is described by referring to flow diagrams and/or block diagrams of methods, devices (systems) and computer program products according to the embodiments of the present disclosure. It should be understood that computer program instructions may implement each flow and/or each block in the flow diagrams and/or the block diagrams and combination of the flows and/or the blocks in the flow diagrams and/or the block diagrams. These computer program instructions may be provided for a general computer, a dedicated computer, an embedded computer or processors of other programmable data processing devices to generate a machine, thereby making the instructions that are executed by the computer or the processors of other programmable data processing devices generate apparatuses for realizing specified functions in one or multiple flows of the flow diagrams and/or one or multiple blocks of the block diagrams.

These computer program instructions may also be stored in a computer readable memory capable of guiding the computer or other programmable data processing devices to work in a specific manner, thereby making the instructions that are stored in the computer readable memory generate manufactured products that include instruction apparatuses. The instruction apparatuses realize the specified functions in one or multiple flows of the flow diagrams and/or one or multiple blocks of the block diagrams.

These computer program instructions also may be loaded onto the computer or other programmable data processing devices to execute a series of operation steps on the computer or other programmable data processing devices to generate computer implemented processing, so that the instructions executed on the computer or other programmable data processing devices provide steps for realizing the specified functions in one or multiple flows of the flow diagrams and/or one or multiple blocks of the block diagrams.

Although the preferred embodiments of the present disclosure have been described, those skilled in the art can make other changes and modifications to these embodiments once they acquire the basic creative concept. Therefore, attached claims is intended to be explained as including the preferred embodiments and all the changes and modifications that fall within the scope of the present disclosure.

Obviously, those skilled in the art can make various changes and modifications to the present disclosure without departing from the spirit and scope of the present disclosure. Therefore, if these changes and transformations of the present disclosure fall within the scope of the claims of the present disclosure and equivalent technologies of the present disclosure, the present disclosure is intended to include these changes and transformations.

What is claimed is:

1. An intrusion detection method based on an improved immune network algorithm, comprising the following steps:
   S1, initializing an antibody group to obtain a network antibody subset, an antibody set B, to be trained;
   S2, calculating affinities between antigens and antibodies, wherein the antigens represent network traffic data, comprising attack data and normal data; and the antibodies represent trained detectors;
   specifically, a training set to be processed is an antigen set $AG=\{ag_1, ag_2, \ldots, ag_i\}$, and the antibody set $B=\{b_1, b_2, \ldots, b_i\}$ is generated by the initializing is S1;
   the affinities between the antigens and the antibodies are represented by Euclidean distance between the antigen set $AG=\{ag_1, ag_2, \ldots, ag_i\}$ and the antibody set $B=\{b_1, b_2, \ldots, b_i\}$; the formula of the affinity between the antigen and the antibody is:

$$D_{ij}=d(ag_i, b_j)=\sqrt{(ag_1-b_1)^2+\ldots+(ag_i-b_j)^2};$$

S3, determining duality antigen pairs, wherein a pair of duality antigens is a pair of inhomogeneous antigens which have the highest affinities, specifically: for an antigen $ag_i \in AG$, if it is determined that an inhomogeneous antigen $ag_j$ is closest to $ag_i$, $ag_i$ and $ag_j$ are determined to be a pair of duality antigen;
   S4, determining a boundary antibody set C, and if an absolute value of a difference value between the affinities between an antibody in the network antibody subset to be trained and one of the duality antigen pairs is less than a threshold R, classifying the antibody into the boundary antibody set, specifically, for $\forall b_k \in B$, $D_{ik}$ is the affinity between $b_k$ and $ag_i$, and $D_{jk}$ is the affinity between $b_k$ and $ag_j$, if $|D_{ik}-D_{jk}|<R$, classifying $b_k$ into the boundary antibody set C, $C \in B$;
   S5, determining a neighbor antibody set, and if the affinity between an antibody in the network antibody subset to be trained and any antigen is less than a threshold M, eliminating the antibody from the network antibody subset, or if the affinity is not less than the threshold M, classifying the antibody into a subnetwork to which an antigen with the highest affinity belongs;

S6, cloning and mutating, according to the affinities, the antibodies after the eliminating to update the subnetwork to which the antigens belong, specifically: for the affinities between the antigens and the antibodies, selecting the first n antibodies with the highest affinities in the current candidate antibody set B, the clone number of the antibody $b_i$, satisfying the following formula:

$$clone_{num} = \max\left(1, \operatorname{int}\left(\frac{Aff_{b_i} + b}{a} * \max\_clone\right)\right);$$

Where a and b are both constants, a>0; and max_clone is the maximum clone number;
a mutation operator for the mutating is as follows:

$$M(b_i) = \begin{cases} \operatorname{operator}(\sigma, b_i), \operatorname{random}(0, 1) < mutation_{rate} \\ b_i, \operatorname{or} \end{cases}$$

where operator ($\delta$, $b_i$) is a crossover and mutation operation for the antibody $b_i$ and a neighbor antibody that is $\delta$ spaced away; $\delta$ is a value according to an antibody affinity; $\delta$ is equal to 1 when the antibody affinity is not less than a predetermined value;

S7, calculating an average affinity between the antibodies in the boundary antibody set C and the antigens in the duality antigen, and classifying the antibodies with high affinities in the boundary antibody set C into the antigen set;

S8, inhibiting the network, and simplifying the network to output a result network subset;

S9, performing intrusion detection based on the result network subset.

2. The intrusion detection method based on the improved immune network algorithm according to claim 1, wherein S1 specifically comprises: selecting a data set CSE-CIC-IDS2018 as the network antibody subset to be trained, comprising data of five attack scenarios: Botnet, Infiltration of The Network from Inside, Brute-force, Dos and DDos, and performing averaging of features of various dimensions and principal component analysis (PCA) dimension reduction processing on the data set CSE-CIC-IDS2018.

3. The intrusion detection method based on the improved immune network algorithm according to claim 1, wherein S5 specifically comprises: for the antibody $b_x$ in the antibody set B={$b_1$, $b_2$, . . . , $b_i$}, if the affinities between $b_x$ and all the antigens in the antigen set AG={$ag_1$, $ag_2$, . . . , $ag_i$} are less than M, eliminating $b_x$, or if the affinities are not less than M, putting $b_x$ into the subnetwork to which the antigen having the highest affinity with the antibody belongs.

4. The intrusion detection method based on the improved immune network algorithm according to claim 1, wherein S7 specifically comprises: calculating the average affinities $D_{ik}$ and $D_{jk}$ between the antibodies in the boundary antibody set C and the antigens in the duality antigen according to the formula of the affinity between the antigen and the antibody in S2, and classifying the antibodies in the boundary antibody set C into a network subset with a high affinity to obtain the subnetwork to which the antigen belongs according to the average affinities $D_{ik}$ and $D_{jk}$.

5. An electronic device, comprising a memory and a processor, wherein the processor is configured to execute a computer management program stored in the memory to perform:

S1, initializing an antibody group to obtain a network antibody subset, an antibody set B, to be trained;

S2, calculating affinities between antigens and antibodies, wherein the antigens represent network traffic data, comprising attack data and normal data; and the antibodies represent trained detectors;
specifically, a training set to be processed is an antigen set AG={$ag_1$, $ag_2$, . . . , $ag_i$}, and the antibody set B={$b_1$, $b_2$, . . . , $b_i$} is generated by the initializing in S1;
the affinities between the antigens and the antibodies are represented by Euclidean distances between the antigen set AG={$ag_1$, $ag_2$, . . . , $ag_i$} and the antibody set B={$b_1$, $b_2$, . . . , $b_i$}; the formula of the affinity between the antigen and the antibody is:

$$D_{ij} = d(ag_i, b_j) = \sqrt{(ag_1 - b_1)^2 + \ldots + (ag_i - b_j)^2};$$

S3, determining duality antigen pairs, wherein a pair of duality antigens is a pair of inhomogeneous antigens which have the highest affinities, specifically: for an antigen $ag_i \in$ AG, if it is determined that an inhomogeneous antigen $ag_j$ is closest to $ag_i$, $ag_i$ and $ag_j$ are determined to be the duality antigen;;

S4, determining a boundary antibody set C, and if an absolute value of a difference value between the affinities between an antibody in the network antibody subset to be trained and one of the duality antigen pairs is less than a threshold R, the antibody is determined to be classified into the boundary antibody set, specifically, for $\forall b_k \in$ B, $D_{ik}$ is the affinity between $b_k$ and $ag_i$, and $D_{jk}$ is the affinity between $b_k$ and $ag_j$, |$D_{ik}-D_{jk}$|<R, $b_k$ is determined to be classified into the boundary antibody set C, C $\in$ B;

S5, determining a neighbor antibody set, and if the affinity between an antibody in the network antibody subset to be trained and any antigen is less than a threshold M, eliminating the antibody from the network antibody subset, or if the affinity is not less than the threshold M, classifying the antibody into a subnetwork to which an antigen with the highest affinity belongs;

S6, cloning and mutating, according to the affinities, the antibodies after the eliminating to update the subnetwork to which the antigens belong, specifically: for the affinities between the antigens and the antibodies, selecting the first n antibodies with the highest affinities in the current candidate antibody set B, the clone number of the antibody $b_i$, satisfying the following formula:

$$clone_{num} = \max\left(1, \operatorname{int}\left(\frac{Aff_{bi} + b}{a} * \max\_clone\right)\right);$$

Where a and b are both constants, a>0; and max_clone is the maximum clone number;
a mutation operator for the mutating is as follows:

$$M(b_i) = \begin{cases} \operatorname{operator}(\delta, b_i), \operatorname{random}(0, 1) < mutation_{rate} \\ b_i, \operatorname{or} \end{cases}$$

where operator ($\delta$, $b_i$) is a crossover and mutation operation for the antibody $b_i$, and a neighbor antibody that is $\delta$ spaced away; $\delta$ is a value according to an antibody affinity; δ is equal to 1 when the antibody affinity is not less than a predetermined value;

S7, calculating an average affinity between the antibodies in the boundary antibody set C and the antigens in the duality antigen, and classifying the antibodies with high affinities in the boundary antibody set C into the antigen set;

S8, inhibiting the network, and simplifying the network to output a result network subset;

S9, performing intrusion detection based on the result network subset.

6. A non-transitory computer-readable storage medium, which stores a computer management program, wherein the computer management program, when executed by a processor, causes the processor to perform:

S1, initializing an antibody group to obtain a network antibody subset, an antibody set B, to be trained;

S2, calculating affinities between antigens and antibodies, wherein the antigens represent network traffic data, comprising attack data and normal data; and the antibodies represent trained detectors;

specifically, a training set to be processed is an antigen set $AG=\{ag_1, ag_2, \ldots, ag_i\}$, and the antibody set $B=\{b_1, b_2, \ldots, b_i\}$ is generated by the initializing in S1;

the affinities between the antigens and the antibodies are represented by Euclidean distances between the antigen set $AG=\{ag_1, ag_2, \ldots, ag_i\}$ and the antibody set $B=\{b_1, b_2, \ldots, b_i\}$; the formula of the affinity between the antigen and the antibody is:

$$D_{ij} = d(ag_i, b_j) = \sqrt{(ag_1 - b_1)^2 + \ldots + (ag_i - b_j)^2};$$

S3, determining duality antigen pairs, wherein a pair of duality antigens is a pair of inhomogeneous antigens which have the highest affinities, specifically: for an antigen $ag_i \in AG$, if it is determined that an inhomogeneous antigen $ag_j$ is closest to $ag_i$, $ag_i$ and $ag_j$ are determined to be the duality antigen;;

S4, determining a boundary antibody set C, and if an absolute value of a difference value between the affinities between an antibody in the network antibody subset to be trained and one of the duality antigen pairs is less than a threshold R, the antibody is determined to be classified into the boundary antibody set, specifically, for $\forall b_k \in B$, $D_{ik}$ is the affinity between $b_k$ and $ag_i$, and $D_{jk}$ is the affinity between $b_k$ and $ag_j$, if $|D_{ik}-D_{jk}|<R$, $b_k$ is determined to be classified into the boundary antibody set C, $C \in B$;

S5, determining a neighbor antibody set, and if the affinity between an antibody in the network antibody subset to be trained and any antigen is less than a threshold M, eliminating the antibody from the network antibody subset, or if the affinity is not less than the threshold M, classifying the antibody into a subnetwork to which an antigen with the highest affinity belongs;

S6, cloning and mutating, according to the affinities, the antibodies after the eliminating to update the subnetwork to which the antigens belong, specifically: for the affinities between the antigens and the antibodies, selecting the first n antibodies with the highest affinities in the current candidate antibody set B, the clone number of the antibody $b_i$, satisfying the following formula:

$$clone_{num} = \max\left(1, \operatorname{int}\left(\frac{Aff_{bi} + b}{a} * \max\_clone\right)\right);$$

Where a and b are both constants, a>0; and max_clone is the maximum clone number;

a mutation operator for the mutating is as follows:

$$M(b_i) = \begin{cases} \operatorname{operator}(\delta, b_i), \operatorname{random}(0, 1) < mutation_{rate} \\ b_i, \text{ or} \end{cases}$$

where operator (δ, $b_i$) is a crossover and mutation operation for the antibody $b_i$ and a neighbor antibody that is δ spaced away; δ is a value according to an antibody affinity; δ is equal to 1 when the antibody affinity is not less than a predetermined value;

S7, calculating an average affinity between the antibodies in the boundary antibody set C and the antigens in the duality antigen, and classifying the antibodies with high affinities in the boundary antibody set C into the antigen set;

S8, inhibiting the network, and simplifying the network to output a result network subset;

S9, performing intrusion detection based on the result network subset.

* * * * *